United States Patent
Bonini et al.

(10) Patent No.: US 10,961,454 B2
(45) Date of Patent: Mar. 30, 2021

(54) METHOD FOR REDUCING WATER STRESS IN PLANTS

(71) Applicant: Agrotecnologias Naturales S.L., La Riera de Gaia (ES)

(72) Inventors: Paolo Bonini, La Riera de Gaia (ES); Veronica Cristina Cirino, La Riera de Gaia (ES)

(73) Assignee: Agrotecnologias Naturales S.L., La Riera de Gaia (ES)

( * ) Notice: Subject to any disclaimer, the term of this patent is extended or adjusted under 35 U.S.C. 154(b) by 0 days.

(21) Appl. No.: 16/479,623

(22) PCT Filed: Jan. 19, 2018

(86) PCT No.: PCT/ES2018/070040
§ 371 (c)(1),
(2) Date: Jul. 22, 2019

(87) PCT Pub. No.: WO2018/134465
PCT Pub. Date: Jul. 26, 2018

(65) Prior Publication Data
US 2020/0208053 A1    Jul. 2, 2020

(30) Foreign Application Priority Data

Jan. 20, 2017 (EP) .................................. 17382027

(51) Int. Cl.
| | |
|---|---|
| *C09K 17/16* | (2006.01) |
| *C05G 3/80* | (2020.01) |
| *C05F 11/08* | (2006.01) |
| *A01C 1/06* | (2006.01) |
| *C05D 1/00* | (2006.01) |
| *C05C 1/00* | (2006.01) |
| *C05B 7/00* | (2006.01) |
| *C05C 5/02* | (2006.01) |
| *C05B 3/00* | (2006.01) |
| *C05C 3/00* | (2006.01) |
| *C05C 5/00* | (2006.01) |

(52) U.S. Cl.
CPC ............... *C09K 17/16* (2013.01); *A01C 1/06* (2013.01); *C05B 3/00* (2013.01); *C05B 7/00* (2013.01); *C05C 1/00* (2013.01); *C05C 3/005* (2013.01); *C05C 5/005* (2013.01); *C05C 5/02* (2013.01); *C05D 1/005* (2013.01); *C05F 11/08* (2013.01); *C05G 3/80* (2020.02)

(58) Field of Classification Search
None
See application file for complete search history.

(56) References Cited

U.S. PATENT DOCUMENTS

| | | | |
|---|---|---|---|
| 8,999,698 B2* | 4/2015 | Kang | A01N 63/10 |
| | | | 435/252.1 |
| 2005/0197252 A1* | 9/2005 | Yamashita | C05F 11/00 |
| | | | 504/103 |
| 2012/0021906 A1* | 1/2012 | Sutton | C12N 3/00 |
| | | | 504/117 |
| 2014/0274719 A1* | 9/2014 | Davison | C05G 3/00 |
| | | | 504/297 |
| 2016/0362345 A1* | 12/2016 | Lipscomb | C05G 5/40 |

FOREIGN PATENT DOCUMENTS

| | | |
|---|---|---|
| GB | 2252553 | 8/1992 |
| GB | 2269378 | 2/1994 |
| WO | WO 2015/180781 | 12/2015 |

OTHER PUBLICATIONS

International Preliminary Report on Patentability dated Dec. 10, 2018 From the International Preliminary Examining Authority Re. Application No. PCT/ES2018/070040. (11 Pages).
International Search Report and the Written Opinion dated Jun. 14, 2018 From the International Searching Authority Re. Application No. PCT/ES2018/070040. (16 Pages).
Larney et al. "Residual Effects of Topsoil Replacement Depths and One-Time Application of Organic Amendments in Natural Gas Wellsite Reclamation", Canadian Journal of Soil Science, XP055352973, 92(6): 883-891, Published Online Nov. 1, 2012.

* cited by examiner

*Primary Examiner* — Wayne A Langel

(57) ABSTRACT

The present invention provides a method for reducing plant water stress which comprises contacting plants with dry milled fibre, particularly wheat fibre and pea fibre. Said contacting is carried out in a manner selected from the group consisting of coating seeds with a mixture comprising dry milled fibre, pelletizing seeds with a mixture comprising dry milled fibre, applying a mixture comprising dry milled fibre in the form of granules, and applying a mixture comprising dry milled fibre in the form of tablets. Prior to said contacting, dry milled fibre is admixed with soil for plants, and the resulting mixture may optional comprise further additives such as fillers, binders, inert powders, colouring agents, fertilizers, fungicides, growth hormones, or microorganisms for inoculation.

14 Claims, No Drawings

METHOD FOR REDUCING WATER STRESS IN PLANTS

RELATED APPLICATIONS

This application is a National Phase of PCT Patent Application No. PCT/ES2018/070040 having International filing date of Jan. 19, 2018, which claims the benefit of priority of European Patent Application No. 17382027.5 filed on Jan. 20, 2017. The contents of the above applications are all incorporated by reference as if fully set forth herein in their entirety.

FIELD AND BACKGROUND OF THE INVENTION

The present invention is directed to a method for reducing plant water stress based on the use of dry milled fibres, particularly wheat fibre and pea fibre, which are capable of increasing plant available water, and also reducing nutrient losses from soil during rain-induced leaching events.

Drought stress or water stress is usually related to the absence of rainfall or irrigation for a significant period of time, wherein such absence causes a dramatic effect on the field capacity due to severely impaired water absorption. Under these circumstances, physiological functions of plant cells may deteriorate, and thus various disorders may arise; therefore, in order to survive, the plants must activate protective mechanisms usually leading to detrimental effects on growth, development and productivity.

By way of illustration, Farooq et al (*Agron. Sustain. Dev.* 2009, 29 (1), 185-212) disclose how drought stress reduces leaf size, stem extension and root proliferation, disturbs plant water relations and decreases water-use efficiency (WUE). It is further described therein that carbon dioxide assimilation by leaves is significantly reduced under drought conditions by stomatal pore closure, membrane damage and enzymatic disturbances, thus causing an enhancement in the metabolite flux, which leads in turn to an increase in the oxidative load on the tissues. The resulting excessive concentration of reactive oxygen species formed is known to be one of the major deterrents to plant growth.

Numerous strategies have been developed throughout the years to tackle this problem and either favour drought tolerance or reduce water stress in plants. For example, US20130210633 discloses the application of an effective amount of one or more compounds selected from a group consisting of a compound represented by the formula $[R_1-X-NHCO-Y-CO-R_2]$ wherein $R_1$ represents an optionally substituted phenyl group, naphthyl group or aromatic heterocyclic group, $R_2$ represents a hydroxyl group, an amino group or a $C_1-C_6$ alkoxy group, X represents a linear or branched $C_1-C_6$ alkylene group, and Y represents a linear or branched $C_1-C_6$ alkylene group or a linear or branched $C_2-C_6$ alkenylene group, for reducing water stress in a plant.

US20150052640 discloses another solution aimed at enhancing drought tolerance of plants, which is based on the application of at least one treatment with an effective amount of trimethylamine-N-oxide dihydrate (TMAO) to the plant, plant part, photosynthetic organism or seed.

Other different approaches have been proposed through the years in order to solve this water-use efficiency issues, several of them based on specific genetic modifications aimed at creating more resistant plants under drought stress conditions. By way of illustration, in WO0177161, a transgenic plant cell is transformed by a GTP binding stress-related protein (GBSRP) coding nucleic acid, thus yielding a new plant with enhanced tolerance to environmental stress conditions including drought, temperature, metal, chemical, pathogenic stress, oxidative stress or combinations thereof.

However, most of these approaches demand the use of potentially hazardous or toxic chemical products, or alternatively require complex and expensive genetic manipulation to obtain enhanced plants or plant parts capable of resisting plant water stress conditions.

Thus, even though considerable improvement has been made in the art towards solving this problem, there is still the need for a new method which is highly accessible, cost-efficient, environmentally friendly, and which preferably does not require any genetic manipulation.

DESCRIPTION OF SPECIFIC EMBODIMENTS OF THE INVENTION

The present invention provides a method for reducing plant water stress by increasing the plant available water, particularly during germination and after transplanting, based on the use of dry milled fibre. Furthermore, this method also advantageously reduces nutrient losses from soil during rain-induced leaching events.

According to the ACCI (American Association of Cereal Chemists), fibre, also known as roughage, is the edible part of plants or analogous carbohydrates which is resistant to digestion and absorption in the human small intestine with complete or partial fermentation in the large intestine. In the agricultural field, fibre is to be understood as the indigestible part of plants, seeds and grains, which requires a fermentation step prior to its absorption by the plant, and it may also include plant or grain components that have been minimally processed. Dietary fibre usually includes compounds such as polysaccharides, oligosaccharides, lignins, and associated plant substances.

Fibre can be either soluble or insoluble, and some plants actually contain significant amounts of both fibre types. Each type of soluble fibre dissolves in water with a different dissolution rate according to its specific physico-chemical properties, so these soluble fibres are usually classified as hydrophilic materials, and can be further subclassified as either high- or low-viscosity soluble fibre. High-viscosity soluble fibre usually presents gelling properties, whereas low-viscosity soluble fibre presents a high water dissolution rate which does not affect the liquid viscosity.

Examples of fibre known in the art include, but are not limited to, wheat, lentil, flax seed, turnip, pea, soy, oat, rye, chia, rice, barley, maize and corn fibre. Among these, the present invention preferably focuses on pea and wheat fibre, which are characterized by their high water retention properties. Additionally, both pea and wheat fibre are known to contain 0.5-2.0% by weight of nitrogen, which represents an additional nitrogen source for plant growth, and can also promote growth of beneficial microbial symbionts.

Regarding the obtention of such types of fibre from source materials, i.e. vegetables, legumes, fruits, whole grains and nuts, a certain number of processing steps is usually required in order to isolate the desired fibre, such as cleaning, drying, sorting, splitting, milling, fractionating, and even dehulling (decorticating), puffing, roasting and grinding. Such processing steps are widely known in the art and easily accessible to a person skilled in the art.

It is also common knowledge that reduction of the particle size is an important step in fibre source material manufacturing, since it leads to a resulting product with increased availability due to its higher surface area, enhanced drying efficiency and end-product functionality. Therefore, milling is regarded as one of the most relevant steps in the obtention of fibre from source materials.

Best known milling techniques in the art include impact milling, attrition milling, knife milling and direct-pressure milling. Impact milling involves the use of a hard object to strike a significant area of the particle to fracture it, such as blunt or hammer-type blades like hammermills, pin mills, universal mills, turbo mills and cage mills. Attrition milling, on the other hand, is mainly based on the use of a horizontal rotating vessel filled with a size-reduction solution wherein, after treatment with a grinding media, free-flowing and spherical particles are obtained. In the knife milling technique, a blade or a set of blades or knives applies a high head-on shear force to particles, thus cutting them up to a predetermined size. Finally, direct-pressure milling occurs when a particle is crushed or pinched between two hardened surfaces, e.g. two rotating bars or one rotating bar and a stationary plate. Examples of the latter include, but are not limited to, roll mills, cracking mills, and oscillator mills.

The term "water stress" or "drought stress" is to be understood as a situation wherein the available water in the soil is significantly reduced, either because the water supply to their roots becomes limiting or when there is a continuous loss of water by transpiration or evaporation.

By "field capacity", it is to be understood the water content of the soil, usually two to three days after a rain or irrigation event has occurred, when the remainder of water has been removed by the downward forces of gravity and water content reaches a nearly constant value. According to the FAO (e.g. FAO publication "*Irrigation water management: training manual No. 1 —Introduction to irrigation*", 1985), field capacity can also be defined as the point, after drainage has stopped, wherein large soil pores are still filled with both air and water, and smaller pores are still full of water.

By "Wilting point" or "permanent wilting point", it is to be understood the minimal point of soil moisture the plant requires not to wilt, i.e. the point beyond which the volumetric water content in the soil is too low for the plant's roots to extract water, so that the plant would no longer be able to recover its turgidity and thus would eventually die.

By "plant available water" it is to be understood the difference between field capacity water content and wilting point in a soil or growing media.

As used herein, the term "about" when used in the present invention preceding a number and referring to it, is meant to designate any value which lies within the range defined by the number ±10% of its value, preferably a range defined by the number ±5%, more preferably a range defined by the number ±2%, still more preferably a range defined by the number±1%. For example "about 10" should be construed as meaning within the range of 9 to 11, preferably within the range of 9.5 to 10.5, more preferably within the range of 9.8 to 10.2, and still more preferably within the range of 9.9 to 10.1.

The present invention provides a method for reducing plant water stress which comprises contacting plants with dry milled fibre, wherein said dry milled fibre is preferably selected from the group consisting of wheat fibre and pea fibre.

According to the method of the present invention, the ratio of dry milled fibre to plants is of about 0.5 g of dry milled fibre per plant to 5.0 g of dry milled fibre per plant.

Such contacting of the dry milled fibre and plants is carried out after previously mixing said dry milled fibre with soil for plants. Preferably, the ratio of dry milled fibres to soil is of about 5 g:1 kg to about 50 g:1 kg, more preferably about 10 g:1 kg to about 30 g:1 kg, still more preferably about 15 g:1 kg to about 25 g:1 kg, and still even more preferably about 20 g:1 kg. It is well known in the state of the art that 1 kg of soil is usually understood as equivalent to 1 $m^3$ of soil.

Said contacting of dry milled fibre with plants can be carried out in several different ways, but preferably, in a manner selected from the group consisting of:
- coating of seeds with a mixture comprising dry milled fibre;
- pelletization of seeds with a mixture comprising dry milled fibre,
- applying a mixture comprising dry milled fibre in the form of granules; and
- applying a mixture comprising dry milled fibre in the form of tablets.

In a first embodiment, said contacting of dry milled fibre with plants can be carried out by coating seeds with a mixture comprising dry milled fibre. Preferably, such coating may be carried out by placing seeds in a mixer or blender, then adding a suitable amount of dry milled fibre and stirring the mixture in order to homogeneously coat said seeds with said suitable amount of dry milled fibre. Such coating step in the mixer or blender is preferably carried out at room temperature.

The ratio of seeds to dry milled fibre may be about 1 kg of seeds per 0.2 g of dry milled fiber to about 1 kg of seeds per 15 g of dry milled fiber; preferably, said ratio of seeds to dry milled fibre may be about 1 kg of seeds per 0.5 g of dry milled fiber to about 1 kg of seeds per 10 g of dry milled fiber; more preferably, said ratio of seeds to dry milled fibre may be about 1 kg of seeds per 0.5 g of dry milled fiber.

In a second embodiment, said contacting of dry milled fibre with plants can be carried out by pelletization of seeds with a mixture comprising dry milled fibre.

Preferably, such mixture further comprises an inert powder. More preferably, such mixture comprising dry milled fibre and inert powder comprises a ratio of dry milled fibre to inert powder about 1:1% weight to about 1:20% weight; still more preferably, about 1:1% weight to about 1:15% weight; still even more preferably, about 1:10% weight.

Examples of suitable inert powder include, but are not limited to, calcium carbonate, diatomaceous earth, aluminum hydroxide, calcium hydroxide, magnesium hydroxide, barium hydroxide, calcium sulfate, calcium sulfite, basic magnesium carbonate, kaolin-clay, dolomite, talc, zeolite, illite, halloysite, bentonite, vermiculite, microlite, peat moss and mixtures thereof. Preferably, inert powders are calcium carbonate, talc and mixtures thereof. Most preferably, the inert powder is talc.

Particularly, the present invention provides a process for producing pelletized seeds with a mixture comprising dry milled fibre. The process comprises the following steps:
a) mixing dry milled fibre and inert powder in a ratio of 1:1 to 1:30 (w/w),
b) loading a coating or pelletizing machine with seeds,
c) gradually adding water and the mixture obtained in step a) to the seeds,
d) drying pelleted seeds obtained in step c) at a temperature of about 30° C. to about 40° C. for about 1 hour to 2 hours, The ratio of dry milled fibre to inert powder of step a), may preferably be about 1:1 to 1:30 (w/w), and more preferably, said ratio may be about 1:1 to 1:20 (w/w).

Regarding steps b)-c) of the above described process, any coating or pelletizing machine known in the art which may be suitable for these coating steps may be employed, as will be obvious to those skilled in the art. Examples of this coating or mixing machine include a rotary coating machine.

Also in reference to steps b)-c), it may be possible to add further components such as adhesive agents and dyes, in order to enhance the adhesion of dry milled fibre and inert powder to the seeds, thus ensuring the complete coating. Particular examples of adhesive agents may include, but are not limited to, water-soluble adhesive agents, more particularly, organic polymers such as methyl cellulose and acacia gum-derived polymers.

In reference to step d), preferred drying conditions include a temperature about 35° C. and a drying period of about 1 hour.

The pelletized seeds obtained after step d) will be ready to be used for planting, or may be alternatively stored up to 2 years in dry conditions.

In a third embodiment, said contacting of dry milled fibre with plants can be carried out by applying a mixture comprising dry milled fibre in the form of granules. Thus, the corresponding dry milled fibre of the invention may be mixed with water, and the resulting dry milled fibre mixture then subjected to comminution in a homogenizer or a grinding machine in order to obtain a granular dry milled fibre product, which may be converted into grains of the desired size, for example, with a fluidized-bed granulator.

In a fourth embodiment, said contacting of dry milled fibre with plants can be carried out by applying a mixture comprising dry milled fibre in the form of tablets. There currently exist numerous methods known in the art for producing tablets; by way of illustration, tablets may be formed by compressing a dry milled fibre mixture, which may optionally comprise a binder, into a cylindrical tablet; several other variations of this process will be obvious for the person skilled in the art. Particularly, tablets of the invention are placed in planting holes in pots or directly in growing fields right before planting of the crop. Usually, one tablet is employed per planting hole, although more than one tablet may be used if necessary. "Planting" is to be understood herein as either the placement of new seeds or a transplanting event, the latter implying the use of plantlets. Once planting is complete, irrigation is performed to promote the dissolution of the at least one tablet, thus releasing dry milled fibre and any further component present in the tablet, into the support, so that all these compounds may express their beneficial effects on the seeds or plantlets, either during germination or transplanting, as above mentioned.

All these four embodiments of the invention may optionally comprise the addition of at least one additive that may be incorporated in the dry milled fibre mixture, selected from the group consisting of fillers, binders, inert powders, dye agents, fertilizers, fungicides, growth hormones, microorganisms for inoculation, such as *Trichoderma* propagules, which may additionally promote growth of microbial symbionts, and any mixture thereof. Preferably, said at least one additive are microorganisms for inoculation.

More preferably, the dry milled fibre mixture present in any of the above described four methods for contacting plants with dry milled fibres of the invention further comprises at least one additive which is a fertilizer selected from the group consisting of ammonium nitrate, ammonium sulphate, potassium sulfate, potassium nitrate, calcium ammonium nitrate, magnesium nitrate, magnesium sulphate, urea phosphate, monoammonium phosphate, diammonium phosphate, monopotassium phosphate, monocalcium phosphate, dicalcium phosphate and mixtures thereof.

More preferably, the ratio of dry milled fibre to fertilizer in the coating mixture is about 1:1 (w/w) to about 9:1 (w/w).

Throughout the description and claims the word "comprise" and variations thereof are not intended to exclude any other technical feature, additive, component or step. Further objects, advantages and features of the invention will become apparent to those skilled in the art upon examination of the description of may be learned by practice of the invention.

The following examples are provided by way of illustration, and shall not be construed as limiting of the present invention. Additionally, the present invention encompasses all the possible combinations of particular and preferred embodiments herein described.

EXAMPLES

Example 1: Effect of Dry Milled Pea Fibre as Soil Amendment

The objective of this experimental test was assessing the increased availability of water for plant growth in a soil previously amended with dry milled pea fibre.

Prior to use, sandy soil with particle diameter below 2 mm and soil bulk density 1.14 mg/m$^3$ was dried at 40° C. in a ventilated oven until constant weight. Afterwards, 10 replicates were prepared containing soil only, and 10 additional replicates were prepared containing a mixture of dry milled pea fibre and said dried sandy soil at a dry milled pea fibre to soil ratio of 20 g:1 kg. Each replicate was prepared by placing either the soil only or the dry milled pea fibre-soil mixture in a 5-cm high metallic cylinder.

Said 20 cylinders containing either the soil alone or the dry milled pea fibre-soil mixture were placed on two porous ceramic plates, each one of them containing 5 replicates of soil alone and 5 replicates of the dry milled pea fibre-soil mixture, for 24 h in a shallow pan of water to allow uniform wetting by capillarity.

Afterwards, one porous ceramic plate was placed into a pressurized container at 33 kPa, whereas the other plate was placed into another pressurized container at 1500 kPa. In both cases, pressure lead to the drainage of the majority of water present in the samples through the porous ceramic plate. Once the equilibrium was reached, i.e. the drainage stopped, the cylinders were removed, and the samples containing either the soil alone or the mixture of dry milled pea fibre and sandy soil were weighted and oven-dried for 24 h at 105° C.

Weight of dry samples previously subjected to 33 kPa was used to estimate the field capacity water content both for soil alone, and dry milled pea fibre-soil mixture samples, whereas weight of dry samples previously subjected to 1500 kPa was used to estimate the wilting point water content both for soil alone, and dry milled pea fibre-soil mixture samples.

Subsequently, plant available water was estimated, both for soil-only samples and soil-dry milled pea fibre mixture samples, by calculating the difference between field capacity water content and wilting point water content. Results from this experimental test are provided in Table I below.

TABLE I

Field capacity water content, wilting point water content and plant available water of sandy soil and sandy soil/dry milled pea fibre mixture (expressed as mean values ± standard deviation).

| Treatment | Field capacity water content | Wilting point water content | Plant available water |
|---|---|---|---|
| Soil samples | 35.2 ± 0.49 | 17.1 ± 0.04 | 18.1 ± 0.54 |
| Soil/dry milled pea fibre mixture samples | 38.9 ± 0.79 | 18.3 ± 0.07 | 20.6 ± 0.81 |

Experimental results evidenced that soil amendment with dry milled pea fibre increases field capacity water content, thus leading to an increase in plant available water.

Example 2: Use of Pea Fibre as Coating Agent for Pelleted Seeds

Dry milled pea fibre (P) was mixed with 8% wt. of talc (T) to obtain the P/T coating mixture. 300 g of tomato seeds were loaded in a rotary coating machine, then 25 ml of water were added, and gradually the P/T mixture was applied, together with water. After the coating agent was fixed on the seed surface, seeds were dried at 35° C. for 1 hour, thus yielding the resulting pelleted tomato seeds.

Pelletized and unpelletized seeds of tomato were sown on polystyrene trays (228 holes per tray) filled with a substrate made with peat and sand (ratio 1:1 v/v). Seeds were placed at 0.5 cm depth. Irrigation was provided after sowing with a mist system. Two liters of water were applied for each tray. Trays were placed in a growth chamber having a relative humidity of 70% and air temperature of 25° C. The continuous evaporation of water from the surface of substrate lead to drought conditions which affected seed germination. Germination was determined by counting the cotyledons emerging from the substrate over a 2 week period. At the end of the trial, pelletized seeds gave a total germination rate which was 85% while the germination of unpelletized seeds, and pelletized seeds with inert powder only, was 55% and 56%, respectively.

Example 3: Use of Pea and Wheat Fibre in Tablet Form, Alone or in Combination with $NH_4NO_3$ Fertilizer Vs $NH_4NO_3$ Fertilizer Alone Different tablets were prepared for this test according to the different characteristics of each treatment to be assessed:
Tablet A: 4 g of dry milled pea fibre.
Tablet B: 4 g of dry milled pea fibre were mixed with 2 g of $NH_4NO_3$.
Tablet C: 4 g of dry milled wheat fibre were mixed with 2 g of $NH_4NO_3$ fertilizer.
Tablet D: 2 g of $NH_4NO_3$ fertilizer.

Components were compressed in separate 2.5 cm, thus yielding 5 different tablets per type, which were subsequently inserted into 2 cm deep holes on the top of 12 cm diameter plastic pots filled with quarziferous sand (0.5 kg sand per pot). The components of each tablet were then wetted with 10 ml of distilled water per tablet. The amount of water added did not cause any leaching of salts since it was completely absorbed by the dry milled fibre.

Distilled water was applied on top of each pot with a dripper (flow rate 2 L/h). Irrigation was stopped after 300 ml of drainage water were collected from the base of each pot. Electrical conductivity of the drainage solution was immediately measured after collection in the four treatments plus the control. Five replicates were taken for each pot to ensure reliability of the results.

TABLE II

Electrical conductivity of 300 ml of drainage water collected from the bottom of each pot after irrigation with a dripper (expressed as mean values ± standard deviation).

| Treatment | Electrical conductivity (dS/m) |
|---|---|
| Control (no tablet application) | 67.2 ± 2.2 |
| Tablet A (dry milled pea fibre alone) | 103.8 ± 12.8 |
| Tablet B (dry milled pea fibre + $NH_4NO_3$ fertilizer) | 1894.8 ± 55.0 |
| Tablet C (dry milled wheat fibre + $NH_4NO_3$ fertilizer) | 1924.3 ± 54.0 |
| Tablet D ($NH_4NO_3$ fertilizer) | 6078.4 ± 227.5 |

Results in Table II demonstrated that the combination of either dry milled pea or wheat fibre with $NH_4NO_3$ fertilizer was able to effectively reduce nutrient and water leaching through the sandy substrate in comparison with $NH_4NO_3$ fertilizer alone.

Example 3: Use of Dry Milled Pea Fibre in Granulated Form for Reducing Transplanting Stress of Horticultural Crops Romaine lettuce plants (*Lactuca sativa* L.) at 2-true leaf stage were transplanted in sandy soil. Pots were irrigated before transplanting up to container capacity. During transplanting, granulated dry milled pea fibre was applied at the bottom of the planting hole in a rate of 1.5 to 3.0 g/plant.

After transplanting, each plant was irrigated with 100 ml of water per plant, and irrigation was stopped until signs of water stress appeared, such as leaf wilting. At that point, SPAD (Soil Plant Analysis Development) and fluorescence values were measured. SPAD chlorophyll meter index was obtained by taking 3 values per plant, from the oldest leaves, and one plant was additionally used for fluorescence analysis. Visual assessment of the plant wilting degree was performed using a subjective score (i.e. wilting score) as defined in Table III:

TABLE III

Wilting score for the assessment of leaf wilting degree in lettuce plants

| Wilting score (W) | Symptoms |
|---|---|
| 1 | Leaves well expanded without wilting symptoms |
| 2 | Leaves slightly folded showing wilting symptoms |
| 3 | Leaves showing severe wilting symptoms |

After a water stress cycle, plants were irrigated again with 200 ml of water and a new stress cycle was imposed. Overall, four stress cycles were performed, and subsequently, plants were harvested during 35 days after transplanting under greenhouse conditions, i.e. 25° C. at day, 18° C. at night and 60% relative humidity.

All data were statistically analyzed by ANOVA, and the Least Significant Difference (LSD) test is applied at P=0.05 on each of the significant variables measured.

Table IV shows leaf chlorophyll content (SPAD index), wilting score (W), and optimal quantum yield ($F_v/F_m$) measured after 11, 14 and 22 days from transplanting on lettuce plants (*Lactuca sativa* L.).

Regarding chlorophyll fluorescence measurements, $F_v/F_m$ ratio or optimal quantum yield represents the maximum potential quantum efficiency of plant Photosystem II (PSII), and is known to be indicative of plant stress damage. According to literature (e.g. "*Chlorophyll Fluorescence: What Is It and What Do the Numbers Mean?*"—USDA Forest Service Proceedings RMRS-P-43, 2006, pages 34-43), $F_v/F_m$ normal range is about 0.7-0.8, so when this value falls below about 0.6, plant survival is considered to be significantly at risk.

$F_v$ is defined as the variable fluorescence height of the fluorescence peak above $F_0$ following exposure to actinic light pulse, wherein $F_0$ is the original fluorescence value which emanates from the light-harvesting pigments of the leaf. $F_m$ is defined as the maximal fluorescence value, i.e. $F_v+F_0$.

TABLE IV

Leaf chlorophyll content (SPAD index), wilting score (W), and optimal quantum yield (Fv/Fm) measured after 11, 14 and 22 days from transplanting on lettuce plants (*Lactuca sativa* L.).

| Dry milled pea fibre (g/pot) | 11 days from transplant | | | 14 days from transplant | | | 22 days from transplant | | |
|---|---|---|---|---|---|---|---|---|---|
| | SPAD | W | Fv/Fm | SPAD | W | Fv/Fm | SPAD | W | Fv/Fm |
| 0 | 15.8 b | 2.0 | 0.81 | 13.8 b | 2.5 a | 0.62 b | 20.4 b | 2.5 a | 0.82 |
| 1.5 | 19.5 a | 1.9 | 0.80 | 20.0 a | 2.1 ab | 0.81 a | 22.0 ab | 2.1 a | 0.81 |
| 3.0 | 20.09 a | 1.5 | 0.82 | 23.0 a | 2.0 b | 0.82 a | 25.3 a | 1.4 b | 0.82 |

Mean values in the same column with the same letters are deemed not to be significantly different according to Least Significant Difference (LSD) test at P ≤ 0.05.

Results from Table IV evidence the significant increase in SPAD chlorophyll index and optimal quantum yield ($F_v/F_m$), together with a significant decrease in the wilting score (W) with increasing amounts of dry milled pea fibre per pot. These experimental results demonstrated that photosynthesis is promoted by incorporating dry milled pea fibre in the pot, in addition to a significant reduction of wilting, that is, a significant water stress reduction.

At the end of the trial, growth and quality analysis were performed. Table V actually reflects the increase in shoot and root fresh weight derived from increasing amounts of dry milled pea fibre.

TABLE V

Mean water consumption per pot, and shoot and root fresh weight at the end of the trial.

| Dry milled pea fibre (g/pot) | Mean water consumption (g/day per pot) | Shoot fresh weight (g/plant) | Root fresh weight (g/plant) |
|---|---|---|---|
| 0 | 11.8 b | 0.61 c | 0.57 b |
| 1.5 | 12.0 b | 1.19 b | 0.76 a |
| 3.0 | 12.4 a | 1.49 a | 0.82 a |

Mean values in the same column with the same letters are deemed not to be significantly different according to Least Significant Difference (LSD) test at P ≤ 0.05.

Example 4: Comparative Study of Dry Milled Pea Fibre Vs Acrylamide-Based Polymer Effects on Water Stress Reduction Lettuce and tomato plantlets previously grown in plug trays were transplanted at 3-4 true leaf stage into 14-cm diameter pots filled with sand, and then grown under greenhouse conditions (i.e. 25° C. at day and 16° C. at night) with 60% relative humidity. Three different treatments were assessed, wherein 10 replicates were prepared for each one of them:

Treatment A (control): 14-cm diameter pots filled with sand only.

Treatment B: 14-cm diameter pots wherein dry milled pea fibre was put in the transplanting hole below the roots at a rate of 3.0 g of dry milled pea fibre per plant.

Treatment C: 14-cm diameter pots wherein acrylamide-based polymer was put in the transplanting hole below the roots at a rate of 0.3 g of dry milled pea fibre per plant. The 10-fold difference between the quantity of dry milled pea fibre and acrylamide-based polymer employed in treatments B and C was introduced in order to compensate for the water holding capacity of such polymer, which is 10 times higher than that of dry milled pea fibre, so that equivalent water holding capacity was ensured in both treatments during the test for comparison reasons.

After transplanting, all pots were irrigated until a minimum of 30% of the total water amount applied was drained, in order to ensure that all pots reached the maximum water holding capacity at the beginning of the trial. Once this point was reached, irrigation was stopped and water content in the pots started to decrease due to evaporation from sand surface and leaf transpiration. Wilting symptoms appeared on the leaves of plants after few days and then, severity of leaf wilting was determined with a subjective score (i.e. wilting score) as defined in Table III.

Relative water content (RWC) was measured on the basis of the second and third leaf from the top of plant, for 10 plants per treatment. RWC is an indicator of water stress in plants, according to the formula defined by Jones and Turner (Plant Physiol. 1978, 25, 591-597), widely known in the state of the art:

$$RWC\ (\%) = [(FW-DW)/(TW-DW)] \times 100$$

Specifically, two leaf discs of 10-mm diameter were excised from the leaves of each plant so, for each treatment, 20 discs were pooled and their sample fresh weight (FW) was determined. They were suspended on distilled water in Petri dishes for 4 h to regain turgidity, and were then thawed and re-weighed, thus obtaining the sample turgid weight (TW). Subsequently, samples were dried at 80° C. for 24 h to determine the sample dry weight (DW).

Additionally, SPAD index measurements were also performed. Such index is directly correlated with leaf chlorophyll content, which is another important water marker. Such measurements were made at a central point on the leaflet between the midrib and the leaf margin, while at the same time the meter was protected from direct sunlight by the operator. In each replicate, ten leaves were measured per treatment and averaged to a single SPAD index value per treatment.

All data were statistically analyzed by ANOVA and the Least Significant Difference (LSD) test is applied at P=0.05 on each of the significant variables measured.

The values shown in Tables VI and VII, reflecting the results obtained with this test for lettuce and tomato leaves, respectively, are mean values corresponding to three replicate samples. Additionally, means within columns are separated using LSD range test, and mean values in the same column with the same letter (a, b or c) are deemed not to be significantly different according to LDS range test at P 0.05.

TABLE VI

Leaf wilting symptoms, leaf relative water content and SPAD index of lettuces for control treatment, soil amended with dry milled pea fibre, and soil amended with acrylamide-based polymer.

| Treatment | Leaf wilting symptoms | Leaf relative water content (%) | SPAD index |
|---|---|---|---|
| Treatment A (control) | 2.6 a | 68.0 b | 17.7 b |
| Treatment B (dry milled pea fibre) | 1.8 c | 80.7 a | 20.0 a |
| Treatment C (acrylamide-based polymer) | 2.2 b | 78.8 a | 17.7 b |

Mean values in the same column with the same letters are deemed not to be significantly different according to Least Significant Difference (LSD) test at P ≤ 0.05.

TABLE VII

Leaf wilting symptoms, leaf relative water content and SPAD index of tomatoes for control treatment, soil amended with dry milled pea fibre, and soil amended with acrylamide-based polymer.

| Treatment | Leaf wilting symptoms | Leaf relative water content (%) | SPAD index |
|---|---|---|---|
| Treatment A (control) | 1.6 a | 69.1 b | 28.5 b |
| Treatment B (dry milled pea fibre) | 1.1 c | 81.5 a | 34.1 a |
| Treatment C (acrylamide-based polymer) | 1.3 b | 74.0 a | 30.8 b |

Mean values in the same column with the same letters are deemed not to be significantly different according to Least Significant Difference (LSD) test at P ≤ 0.05.

After 5 days under water stress conditions, lettuce and tomato plants treated with dry milled pea fibre showed less wilting in comparison with control plants and plants treated with the acrylamide-based polymer. SPAD index was found to be significantly higher in the leaves of those plants treated with dry milled pea fibre.

Thus, it was concluded that plants treated with pea fibre exhibit reduced water stress, i.e. lower leaf wilting and higher leaf relative water content, and increased leaf chlorophyll content of plants when compared to plants treated with acrylamide-based polymer. These advantageous effects are even more dramatically increased in comparison with untreated control plants.

What is claimed is:

1. A method for reducing plant water stress which comprises contacting plants with dry milled pea fibre, wherein the ratio of dry milled pea fibre to plants is of 0.5 g dry milled pea fibre per plant to 5.0 g of dry milled pea fibre per plant.

2. The method according to claim 1, wherein said contacting is carried out after previously mixing said dry milled pea fibre with soil for plants according to a ratio of dry milled pea fibre to soil of 5 g:1 kg to 50 g:1 kg.

3. The method according to claim 2, wherein the ratio of dry milled pea fibre to soil is of 10 g:1 kg to 30 g:1 kg.

4. The method according to claim 2, wherein said contacting is carried out in a manner selected from the group consisting of:
   coating of seeds with a mixture comprising dry milled pea fibre;
   pelletization of seeds with a mixture comprising dry milled pea fibre;
   applying a mixture comprising dry milled pea fibre in the form of granules; and
   applying a mixture comprising dry milled pea fibre in the form of tablets.

5. The method according to claim 2, wherein said mixture comprising dry milled pea fibre further comprises at least one additive selected from the group consisting of fillers, binders, inert powders, dye agents, fertilizers, fungicides, growth hormones, microorganisms for inoculation, and any mixture thereof.

6. The method according to claim 5, wherein said at least one additive is microorganisms for inoculation.

7. The method according to claim 5, wherein said at least one additive is a fertilizer selected from the group consisting of ammonium nitrate, ammonium sulphate, potassium sulfate, potassium nitrate, calcium ammonium nitrate, monoammonium phosphate, diammonium phosphate, monopotassium phosphate, monocalcium phosphate, dicalcium phosphate and mixtures thereof.

8. The method according to claim 7, wherein the ratio of dry milled pea fibre to fertilizer is of 1:1 (w/w) to 9:1 (w/w).

9. The method according to claim 4, wherein said contacting is carried out in the form of coating of seeds with a coating mixture comprising dry milled pea fibre.

10. The method according to claim 9, wherein the ratio of seeds to dry milled pea fibre is 1 kg of seeds per 0.2 g of dry milled pea fibre to 1 kg of seeds per 15 g of dry milled pea fibre.

11. The method according to claim 4, wherein said contacting is carried out by pelletization of seeds with a mixture comprising dry milled pea fibre, wherein such mixture further comprises an inert powder selected from the group consisting of calcium carbonate, diatomaceous earth, aluminum hydroxide, calcium hydroxide, magnesium hydroxide, barium hydroxide, calcium sulfate, calcium sulfite, basic magnesium carbonate, kaolin-clay, dolomite, talc, zeolite, illite, halloysite, bentonite, vermiculite, microlite, peat moss and mixtures thereof.

12. The method according to claim 11, wherein the ratio of dry milled pea fibre to inert powder is 1:1% wt. to 1:20% wt.

13. The method according to claim 11, wherein the inert powder is talc.

14. The method according to claim 4, wherein said contacting is carried out by applying a mixture comprising dry milled pea fibre in the form of tablets.

* * * * *